(12) United States Patent
Kim et al.

(10) Patent No.: US 11,851,348 B2
(45) Date of Patent: *Dec. 26, 2023

(54) WASTE WATER INCINERATING METHOD AND APPARATUS THEREFOR

(71) Applicant: LG CHEM, LTD., Seoul (KR)

(72) Inventors: Tae Woo Kim, Daejeon (KR); Sung Kyu Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 509 days.

This patent is subject to a terminal disclaimer.

(21) Appl. No.: 17/054,736

(22) PCT Filed: Jan. 20, 2020

(86) PCT No.: PCT/KR2020/000920
§ 371 (c)(1),
(2) Date: Nov. 11, 2020

(87) PCT Pub. No.: WO2020/242006
PCT Pub. Date: Dec. 3, 2020

(65) Prior Publication Data
US 2023/0159351 A1    May 25, 2023

(30) Foreign Application Priority Data

May 28, 2019 (KR) .................. 10-2019-0062726
Jan. 16, 2020 (KR) .................. 10-2020-0005770

(51) Int. Cl.
*C02F 1/04* (2023.01)
*C02F 1/74* (2023.01)
(Continued)

(52) U.S. Cl.
CPC ............. *C02F 1/048* (2013.01); *C02F 1/043* (2013.01); *C02F 1/74* (2013.01); *F23G 5/46* (2013.01);
(Continued)

(58) Field of Classification Search
CPC .. C02F 1/043; C02F 1/048; C02F 1/74; C02F 2201/002; F26G 5/46
See application file for complete search history.

(56) References Cited

U.S. PATENT DOCUMENTS 4,232,614 A * 11/1980 Fitch .................. F23G 7/001
110/238
4,714,032 A * 12/1987 Dickinson .............. F23K 1/00
110/238

(Continued)

FOREIGN PATENT DOCUMENTS

CN        1313944 A     9/2001
CN      104359113 A     2/2015
(Continued)

*Primary Examiner* — Jonathan Miller
(74) *Attorney, Agent, or Firm* — Bryan Cave Leighton Paisner LLP

(57) ABSTRACT

A waste water incinerating method comprising supplying waste water to an evaporator to evaporate the waste water, supplying an evaporator top discharge stream discharged from the evaporator to an incinerator to incinerate the discharge stream, mixing two or more incinerator discharge streams including a first incinerator discharge stream and a second incinerator discharge stream discharged from the incinerator to form a mixed discharge stream, and heat-exchanging the mixed discharge stream and a fresh air stream in a first heat exchanger, wherein the first incinerator discharge stream is passed through a second heat exchanger, then mixed with the second incinerator discharge stream to form the mixed discharge stream.

9 Claims, 2 Drawing Sheets

(51) Int. Cl.
 *F23G 5/46* (2006.01)
 *B01D 3/00* (2006.01)
 *C02F 1/16* (2023.01)

(52) U.S. Cl.
 CPC ............... *B01D 3/007* (2013.01); *C02F 1/16* (2013.01); *C02F 2201/002* (2013.01)

(56) References Cited

U.S. PATENT DOCUMENTS

| | | | | |
|---|---|---|---|---|
| 5,000,099 A | * | 3/1991 | Dickinson | ............. C02F 11/086 110/238 |
| 6,125,633 A | * | 10/2000 | Strohmeyer, Jr. | ....... F23G 7/001 60/671 |
| 6,397,766 B1 | * | 6/2002 | Oh | .......................... F23G 5/006 110/238 |

FOREIGN PATENT DOCUMENTS

| | | | |
|---|---|---|---|
| CN | 109442438 | A | 3/2018 |
| GB | 1408606 | A | 10/1975 |
| JP | 2017-000983 | A | 1/2017 |
| KR | 10-2003-0062495 | A | 7/2003 |
| KR | 10-2005-0121786 | A | 12/2005 |
| KR | 10-0967747 | B1 | 7/2010 |
| KR | 10-2010-0128534 | A | 12/2010 |
| KR | 10-1154826 | B1 | 6/2012 |
| KR | 10-1190250 | B1 | 10/2012 |
| KR | 10-2016-0117674 | A | 10/2016 |
| KR | 10-1721137 | B1 | 4/2017 |
| KR | 10-1773080 | B1 | 9/2017 |
| KR | 10-2018-0133127 | A | 12/2018 |

* cited by examiner

WASTE WATER INCINERATING METHOD AND APPARATUS THEREFOR

CROSS-REFERENCE TO RELATED APPLICATIONS

The present application is a National Phase entry pursuant to 35 U.S.C § 371 of International Application No. PCT/KR2020/000920 filed on Jan. 20, 2020, and claims benefit of priority of Korean Patent Application No. 10-2019-0062726 filed on May 28, 2019 and Korean Patent Application No. 10-2020-0005770 filed on Jan. 16, 2020, the disclosures of which are incorporated herein by reference in its entirety.

FIELD

The present application relates to a waste water incinerating method and a waste water incinerating apparatus, and more particularly, to an energy-saving waste water incinerating method and waste water incinerating apparatus for recycling waste heat generated when waste water is incinerated.

BACKGROUND

Volatile organic compounds, which collectively refer to hydrocarbon compounds, are severely malodorous substances generated during painting work in chemical plants, waste water treatment plants, automobile factories, and the like, harmful substances exhibiting carcinogenic properties, as well as photochemical smog-causing substances such as ozone, and substances causing global warming and stratospheric ozone depletion that affects the atmosphere in a variety of forms, including adverse environmental and health effects. Therefore, discharge of waste water containing the volatile organic compounds to the outside as is brings about severe environmental contamination, and thus, the waste water must be discharged after pollutants therein are treated first.

Currently known techniques for treating volatile organic compounds in waste water include incineration, adsorption removal, absorption, cooling condensation, biological treatment, membrane technology, and the like, among which a regenerative thermal oxidizer (RTO) is widely used.

The RTO (i.e., furnace or incinerator) is a facility which incinerates a waste gas containing volatile organic compounds and recovers heat generated during incineration through a ceramic filler which has a larger surface area and which is semi-permanently used to significantly reduce an operation cost of the incinerator, instead of using an existing direct flame type indirect heat-exchange regenerative thermal oxidizer (general incinerator method), which incurs low cost for an incinerator operation and minimizes an installation area. Further, treatment efficiency of the RTO is as high as 99% or more and a secondary pollution factor is small.

However, in incinerating waste water containing volatile organic compounds using the RTO, since waste water is directly injected to the furnace, an excessive amount of heat (energy) must be supplied to the furnace, and since a heat recovery design is not advanced, a temperature of the stream discharged to the atmosphere is very high, resulting in an increase in waste of energy.

Therefore, in order to solve the problems of the related art, a design for saving energy in waste water incineration is required.

SUMMARY

An exemplary embodiment of the present application provides an energy saving waste water incinerating method and apparatus to solve the problems mentioned in the background.

In other words, the present application provides a waste water incinerating method and apparatus for saving energy required for incinerating waste water and lowering a temperature of a stream discharged to the atmosphere by recycling waste heat through heat-exchanging the waste heat generated from waste water incineration.

In one general aspect, a waste water incinerating method includes: (S10) supplying waste water to an evaporator and evaporating the waste water; (S20) supplying an evaporator top discharge stream discharged from the evaporator to an incinerator and incinerating the discharge stream; (S30) mixing two or more incinerator discharge streams including a first incinerator discharge stream and a second incinerator discharge stream discharged from the incinerator and forming a mixed discharge stream; and (S40) heat-exchanging the mixed discharge stream and a fresh air stream in a first heat exchanger, wherein the first incinerator discharge stream is passed through a second heat exchanger, then mixed with the second incinerator discharge stream to form the mixed discharge stream.

In another general aspect, a waste water incinerating apparatus includes: an evaporator evaporating supplied waste water and supplying an evaporator top discharge stream to an incinerator; the incinerator receiving the top discharge stream supplied from the evaporator and incinerating the evaporator top discharge stream to supply two or more incinerator discharge streams including a first incinerator discharge stream and a second incinerator discharge stream to a third mixer; the third mixer receiving the two or more incinerator discharge streams including the first incinerator discharge stream and the second incinerator discharge stream supplied from the incinerator and supplying a mixed discharge stream of the first incinerator discharge stream and the second incinerator discharge stream to a first heat exchanger; the first heat exchanger heat-exchanging the mixed discharge stream supplied from the third mixer with a supplied fresh air stream; and a second heat exchanger heat-exchanging the first incinerator discharge stream discharged from the incinerator and supplying the heat-exchanged first incinerator discharge stream to the third mixer.

According to the waste water incinerating method and waste water incinerating apparatus of the present application, the use of fuel for generating heat in the waste water incinerating process may be reduced by recovering waste heat generated during incineration of waste water and recycling the recovered waste heat as a fresh air stream supplied to the incinerator through heat exchange.

In addition, according to the waste water incinerating method and waste water incinerating apparatus of the present application, a temperature of a stream discharged to the atmosphere may be lowered by recovering waste heat generated during incineration of waste water and recycling the recovered waste heat through heat exchange.

DETAILED DESCRIPTION

Figure 1:
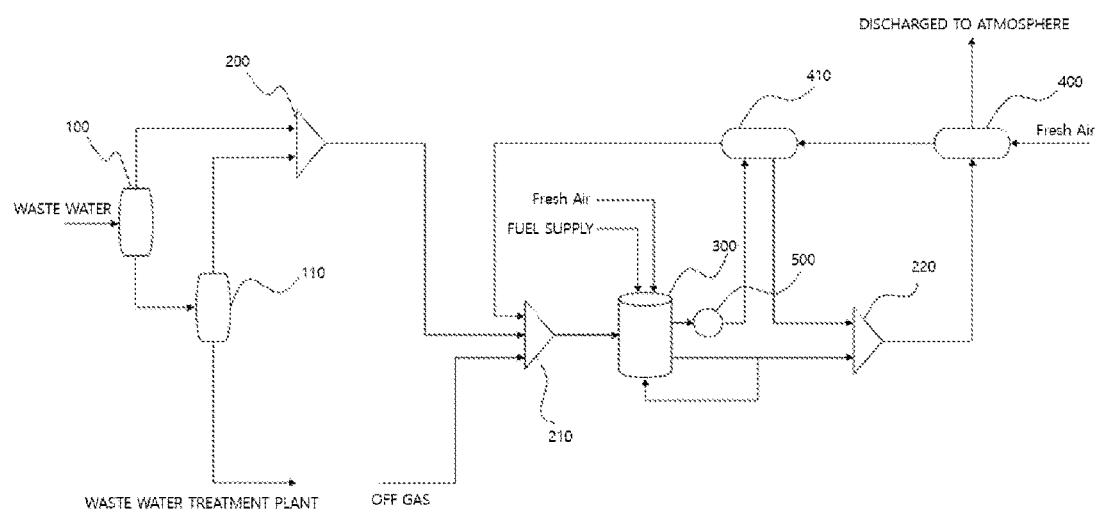
FIGS. 1 and 2 are process flow diagrams of a waste water incinerating method according to exemplary embodiments of the present application.

Terms and words used in the present specification and claims are not to be construed as a general or dictionary meaning but are to be construed as meaning and concepts meeting the technical ideas of the present application based on a principle that the inventors may appropriately define the concepts of terms in order to describe their own inventions in the detailed description.

In the present application, the term "stream" may refer to a flow of fluid in a process or may refer to a fluid itself flowing in a pipe. Specifically, the 'stream' may refer to both the fluid itself and a flow of the fluid flowing in a pipe connecting each device. In addition, the fluid may refer to a gas or a liquid.

Hereinafter, the present application will be described in more detail to aid in understanding the present application.

According to the present application, a waste water incinerating method is provided. The waste water incinerating method includes: (S10) supplying waste water to an evaporator and evaporating the waste water; (S20) supplying an evaporator top discharge stream discharged from the evaporator to an incinerator 300 and incinerating the discharge stream; (S30) mixing two or more incinerator discharge streams including a first incinerator discharge stream and a second incinerator discharge stream discharged from the incinerator and forming a mixed discharge stream; and (S40) heat-exchanging the mixed discharge stream and a fresh air stream in a first heat exchanger 400, wherein the first incinerator discharge stream is passed through a second heat exchanger 410, then mixed with the second incinerator discharge stream to form the mixed discharge stream.

According to an embodiment of the present application, in modern society with consumer life and industrial activities, various wastes continue to be discharged as byproducts of material civilization activities, and among the wastes, waste water is a waste discharged in a liquid form according to an embodiment of the present application. Specifically, waste water is classified as household waste water and factory waste water according to sources thereof. Household waste water may refer to waste water discharged from each household and public buildings and business buildings that discharge waste substances similarly to households, and factory waste water may refer to waste water discharged from each factory, which may be referred to as industrial waste water in a broad sense and may collectively refer to waste water discharged from all industrial facilities.

According to an embodiment of the present application, the waste water may be a liquid factory waste water containing various chemicals used in industrial production processes. For example, the waste water may be composed of organic substances including water, methanol, butanol, neopentyl glycol, sodium chloride, butyl aldehyde, octanol, trimethylamine, and the like.

According to an embodiment of the present application, in the step (S10) of supplying waste water to an evaporator and evaporating the waste water, for example, while waste water is being supplied to the evaporator and heated to be evaporated, the waste water may be separated into a top discharge stream including water vapor, organic matter, and a plastic substance, and a bottom discharge stream including sludge. Here, the bottom discharge stream may be transported directly to a waste water treatment plant.

According to an embodiment of the present application, the step (S10) of supplying the waste water to the evaporator and evaporating the waste water may be performed multiple times to more effectively separate the top discharge stream and the bottom discharge stream. For example, while the waste water is being supplied to a first evaporator (100) and heated so as to be evaporated, the waste water may be separated into a first evaporator top discharge stream and the first evaporator bottom discharge stream. Thereafter, the first evaporator bottom discharge stream is secondly evaporated using a second evaporator (110) so as to be separated into the second evaporator top discharge stream and a second evaporator bottom discharge stream. Here, the second evaporator top discharge stream may be mixed with the first evaporator top discharge stream in a first mixer (200) and discharged, and the second evaporator bottom discharge stream may be transferred to the waste water treatment plant.

According to an embodiment of the present application, step (S20) of supplying the evaporator top discharge stream discharged from the evaporator to an incinerator 300 and incinerating the same may be performed through a regenerative thermal oxidizer (RTO), and the evaporator top discharge stream may be supplied to the incinerator (300) and undergo a preheating step and an incineration step. Here, the evaporator top discharge stream may be a stream discharged after the first evaporator top discharge stream and the second evaporator top discharge stream are mixed in the first mixer (200).

According to an embodiment of the present application, temperature of the evaporator top discharge stream may be increased to 100° C. or higher during the evaporation process. In this case, the evaporator top discharge stream itself having the temperature of 100° C. or higher may be supplied to the incinerator (300) and utilized as fuel.

The evaporator top discharge stream may first come into direct contact with a ceramic medium heat-stored in a heat storage layer so as to be preheated and enter the incinerator (i.e., RTO, 300). Here, a preheating temperature may differ depending on a heat storage efficiency design of the incinerator (300), but the evaporator top discharge stream may be combined with heat of combustion generated while being burned by itself so as to be preheated up to a temperature of 800° C. or higher, which is almost a temperature of the incinerator (300). After the preheated stream is completely incinerated in the incinerator (300), it provides heat to the ceramic medium to heat the ceramic medium, while passing through another heat storage layer, and the incinerator discharge stream may be partially cooled.

According to an embodiment of the present application, the incinerator (300) may discharge two or more incinerator discharge streams including a first incinerator discharge stream and a second incinerator discharge stream. For example, the incinerator (300) may further discharge third to fifth incinerator discharge streams. Here, the two or more incinerator discharge streams discharged from the incinerator (300) may form a mixed discharge stream through the third mixer (220).

The two or more incinerator discharge streams including the first incinerator discharge stream and the second incinerator discharge stream may be mixed through the third mixer (220) to form a mixed discharge stream in step S30, and the mixed discharge stream may be heat-exchanged with a fresh air stream in the first heat exchanger (400) in step S40 and then discharged to the atmosphere.

The mixed discharge stream and the fresh air stream may be heat-exchanged with each other by a counter-current flow, a co-current flow, or a cross flow in the first heat exchanger (400). Here, the mixed discharge stream is discharged to the atmosphere, while being deprived of heat to the fresh air stream, whereby a temperature of the stream discharged to the atmosphere may be lowered. In addition, the fresh air stream which obtains heat from the mixed discharge stream and increases temperature may be supplied to the incinerator (300) to replace part of energy required in the incinerator.

Temperatures of the two or more incinerator discharge streams including the first incinerator discharge stream and the second incinerator discharge stream discharged from the incinerator 300 may be different from each other. Specifically, the incinerator discharge streams separately discharged as two or more streams from the incinerator may have different discharge temperatures. As one example, when the incinerator discharge stream is discharged as the first incinerator discharge stream and the second incinerator discharge stream, the temperature of the first incinerator discharge stream may be higher than the temperature of the second incinerator discharge stream.

As such, since the incinerator discharge streams are discharged at different temperatures, the incinerator discharge streams may be utilized according to temperatures thereof. For example, the first incinerator discharge stream discharged at a high temperature may save process energy by additionally recycling waste heat in the second heat exchanger (410) and a steam generator (500) to be described later. In addition, the second incinerator discharge stream discharged at a relatively low temperature may be returned to the incinerator (300) and recycled to preheat and heat the incinerator (300).

Specifically, the first incinerator discharge stream may be heat-exchanged with the fresh air stream which has passed through the first heat exchanger (400) or the mixed stream of the fresh air stream and the evaporator top discharge stream in the second heat exchanger (410) and then mixed with the second incinerator discharge stream to form the mixed discharge stream.

Here, the first incinerator discharge stream may transfer heat to the fresh air stream or to the evaporator top discharge stream and thereby partly reduce its temperature while passing through the second heat exchanger (410), and thereby further reducing the temperature of the stream discharged to the atmosphere by reusing waste heat in the process.

Further, according to an embodiment of the present application, the temperature of the first incinerator discharge stream may be 400° C. to 500° C., 420° C. to 480° C., or 440° C. to 460° C., and the temperature of the second incinerator discharge stream may be 100° C. to 250° C., 130° C. to 220° C., or 170° C. to 190° C. As such, since energy is recycled by dividing the stream discharged from the incinerator (300) into the first incinerator discharge stream having a relatively high temperature and the second incinerator discharge stream having a low temperature, energy may be saved more effectively.

In addition, according to an embodiment of the present application, the first incinerator discharge stream discharged from the incinerator (300) may be a stream which has passed through a steam generator (500). Specifically, the first incinerator discharge stream discharged from the incinerator (300) may be discharged at a high temperature of 800° C. to 1,000° C. when discharged from the incinerator (300), and here, the first incinerator discharge stream having the high temperature may be lowered in temperature to 400° C. to 500° C., while passing through the steam generator (500), and in this process, thermal energy may be recycled during the formation of steam. While the first incinerator discharge stream passes through the steam generator (500), steam formed from waste heat of the first incinerator discharge stream may be stored and used as a heat source in various processes.

In addition, according to an embodiment of the present application, the first incinerator discharge stream may be heat-exchanged with the fresh air stream which has passed through the first heat exchanger (400) or the mixed stream of the fresh air stream and the evaporator top discharge stream in the second heat exchanger (410). The first incinerator discharge stream and the fresh air stream which has passed through the first heat exchanger (400) or the mixed stream of the fresh air stream and the evaporator top discharge stream may be heat-exchanged with each other by a counter-current flow, a co-current flow, or a cross flow in the second heat exchanger (410). Here, the mixed stream of the fresh air stream and the evaporator top discharge stream may refer to a mixed stream discharged after the fresh air stream and the evaporator top discharge stream which has passed through the first heat exchanger (400) are mixed in the second mixer (210). Here, in some cases, off gas generated in the waste water treatment plant may be further mixed in addition to the fresh air stream and the evaporator top discharge stream which has passed through the first heat exchanger (400), in the second mixer 210.

The first incinerator discharge stream may be heat-exchanged with the fresh air stream which has passed through the first heat exchanger (400) or the mixed stream of the fresh air stream and the evaporator top discharge stream in the second heat exchanger (410), thereby providing heat to the fresh air stream or the mixed stream so as to be recycled as a heat source of waste water incineration, and at the same time, the first incinerator discharge stream heat-exchanged in the second heat exchanger (410) may be mixed with the second incinerator discharge stream at a lower temperature to form a mixed discharge stream, and the mixed discharge stream may transfer heat to the fresh air stream in the first heat exchanger (400) so as to be discharged to the atmosphere at an even lower temperature.

Further, according to an embodiment of the present application, the temperature of the first incinerator discharge stream which has passed through the second heat exchanger (410) may be lower than the temperature of the first incinerator discharge stream before passing through the second heat exchanger (410). Specifically, as described above, the first incinerator discharge stream is heat-exchanged with the fresh air stream which has passed through the first heat exchanger (400) or the mixed stream of the fresh air stream and the evaporator top discharge stream in the second heat exchanger (410). Here, the first incinerator discharge stream provides heat to the fresh air stream or the mixed stream of the fresh air stream and the evaporator top discharge stream, and thus, the temperature of the first incinerator discharge stream after passing through the second heat exchanger (410) is lowered. For example, the temperature of the first incinerator discharge stream which has passed through the second heat exchanger (410) may be 250° C. to 350° C., 270° C. to 330° C. or 280° C. to 300° C. It can be seen that the temperature of the first incinerator discharge stream has been reduced as compared to 400° C. to 500° C., which is the temperature of the first incinerator discharge stream before passing through the second heat exchanger (410).

In addition, according to an embodiment of the present application, the temperature of the stream discharged to the atmosphere from the first heat exchanger (400) may be 90° C. or lower. For example, the temperature of the stream discharged to the atmosphere may be 30° C. to 90° C., 50° C. to 90° C., or 70° C. to 90° C. This is a significantly lower temperature compared to the temperature of the stream discharged to the atmosphere during the incineration of waste water using the existing RTO, and through this, the waste water incinerating method according to the present application recycles a large amount of heat in the waste water incinerating process and saves a large amount of energy accordingly.

Specifically, the waste water incinerating method according to the present application primarily recycles heat by exchanging heat of the first incinerator discharge stream having a high temperature with the fresh air stream which has passed through the first heat exchanger (400) or the mixed stream of the fresh air stream and the evaporator top discharge stream in the second heat exchanger (410), and secondarily recycles heat by exchanging heat of the mixed discharge stream discharged from the incinerator (300) with the fresh air stream in the first heat exchanger (400), thereby effectively saving energy.

Further, according to an embodiment of the present application, the fresh air stream which has passed through the first heat exchanger (400) or the mixed stream of the fresh air stream and the evaporator top discharge stream may be supplied to the incinerator (300) through the second heat exchanger (410). A temperature of the fresh air stream or the mixed stream of the fresh air stream and the evaporator top discharge stream which has passed through the second heat exchanger 410 may be higher than a temperature thereof before passing through the second heat exchanger (410). Specifically, the temperature of the fresh air stream or the mixed stream of the fresh air stream and the evaporator top discharge stream may be 200° C. to 300° C., 215° C. to 260° C., or 230° C. to 250° C.

Specifically, the fresh air stream may obtain heat from the stream discharged from the incinerator (300) by heat exchange through the first heat exchanger (400) and the second heat exchanger (410) so as to be supplied in a high temperature state to the incinerator (300). In this case, energy required for heating in the incinerator (300) may be saved as compared to a case where air is supplied at room temperature to the incinerator (300). For example, the temperature of the fresh air stream which has passed through the first heat exchanger (400) may be 150° C. to 230° C., 170° C. to 220° C., or 200° C. to 210° C. In addition, the temperature of the fresh air stream which has passed through the second heat exchanger may be 250° C. to 350° C., 270° C. to 320° C., or 280° C. to 300° C. This hot fresh air stream may be mixed with the evaporator top discharge stream in the second mixer (210), and the mixed stream may be supplied to the incinerator (300). Here, the incinerator (300) may be a regenerative thermal oxidizer (RTO). In this case, the evaporator top discharge stream may be partially heated due to the fresh air stream before being supplied to the incinerator (300), thereby saving fuel input to obtain the energy used for preheating the waste water in the incinerator (300).

In addition, the mixed stream of the fresh air stream and the evaporator top discharge stream may obtain heat from the first incinerator discharge stream discharged from the incinerator (300) by heat exchange through the second heat exchanger (410) so as to be supplied in a high temperature state to the incinerator (300). This saves the energy required for heating the waste water in the incinerator (300) as compared to the case where the mixed stream of the fresh air stream and the evaporator top discharge stream discharged from the second mixer (210) is immediately supplied to the incinerator (300). For example, the temperature of the mixed stream of the fresh air stream and the evaporator top discharge stream which has passed through the second heat exchanger (410) may be 220° C. to 270° C., 230° C. to 260° C., or 240° C. to 250° C. This is a high temperature as compared to 160° C. to 180° C. which is a general temperature of the evaporator top discharge stream, thus saving the amount of energy required for incinerating the waste water in the incinerator (300).

In addition, according to an embodiment of the present application, in the step (S20) of supplying the evaporator top discharge stream discharged from the evaporator to the incinerator (300) and incinerating the stream, if necessary, fuel may be input to obtain the energy required for preheating and heating waste water. In the step of supplying the evaporator top discharge stream discharged from the evaporator to the incinerator (300) and incinerating the stream, fuel may be input at 800 kg/hr. or lower, for example, may be input at 0 kg/hr. to 800 kg/hr., 400 kg/hr. to 800 kg/hr., or 700 kg/hr. to 800 kg/hr.

In addition, according to an embodiment of the present application, a portion of the second incinerator discharge stream discharged from the incinerator (300) may be returned to the incinerator (300) and recycled to preheat and heat the incinerator (300).

In addition, according to an embodiment of the present application, air may be further supplied to further facilitate the incineration of waste water in the incinerator (300).

In addition, according to an embodiment of the present application, a bottom discharge stream of the evaporator may be moved to a waste water treatment plant and an off gas that occurs in the waste water treatment plant may be supplied to the incinerator (300). Through this, the waste water incinerating method according to the present application may simultaneously incinerate both the waste water and the off gas generated in the waste water treatment plant.

According to the present application, a waste water incinerating apparatus is provided. The waste water incinerating apparatus includes an evaporator evaporating supplied waste water and supplying an evaporated top discharge stream to an incinerator, an incinerator (300) receiving the top discharge stream supplied from the evaporator and incinerating the evaporator top discharge stream to supply two or more incinerator discharge streams including a first incinerator discharge stream and a second incinerator discharge stream to a third mixer (220), the third mixer (220) receiving the two or more incinerator discharge streams including the first incinerator discharge stream and the second incinerator discharge stream supplied from the incinerator (300) and supplying a mixed discharge stream of the first incinerator discharge stream and the second incinerator discharge stream to a first heat exchanger (400), the first heat exchanger (400) heat-exchanging the mixed discharge stream supplied from the third mixer (220) with the supplied fresh air stream, and a second heat exchanger (410) heat-exchanging a first incinerator discharge stream discharged from the incinerator (300) and supplying the heat-exchanged first incinerator discharge stream to the third mixer (220).

According to an embodiment of the present application, the waste water incinerating apparatus according to the present application may be an apparatus for performing a process according to the waste water incinerating method described above.

According to an embodiment of the present application, the waste water incinerating apparatus according to the present application may be described with reference to FIGS. 1 and 2 hereinafter. For example, the waste water incinerating apparatus may include the first evaporator (100) primarily evaporating supplied waste water to separate the waste water into a first top discharge stream including water vapor, organic matter, plastic substance, and the like and a first bottom discharge stream including sludge. In addition, the first bottom discharge stream discharged from the first evaporator (100) may be secondly evaporated using the second evaporator (110) so as to be separated into a second top discharge stream and a second bottom discharge stream. Here, the second bottom discharge stream is transferred to the waste water treatment plant, and the second top discharge stream may be mixed with the first top discharge stream in the first mixer (200) and discharged. The stream discharged from the first mixer (200) may be supplied to the second mixer (210) and mixed with the off gas generated in the waste water treatment plant and a fresh air stream in the second mixer (210). Here, the fresh air stream may have been heat-exchanged, while passing through the first heat exchanger (400) or the second heat exchanger (410).

The mixed stream discharged from the second mixer (210) may be transferred to the incinerator (300). Additional fuel or air may be selectively introduced to the incinerator (300). The incinerator (300) may incinerate the mixed stream discharged from the second mixer (210) and separately discharge the first incinerator discharge stream and the second incinerator discharge stream according to temperatures.

The first incinerator discharge stream and the second incinerator discharge stream may be mixed in the third mixer (220). Here, the first incinerator discharge stream may be heat-exchanged in the second heat exchanger (410) and then mixed with the second incinerator discharge stream in the third mixer (220).

Before being supplied to the second heat exchanger (410), the first incinerator discharge stream may form steam, while passing through the steam generator (500), and then be supplied to the second heat exchanger (410).

The mixed stream mixed in the third mixer (220) may be supplied to the first heat exchanger (400), heat-exchanged with a fresh air stream in the first heat exchanger (400), and then discharged to the atmosphere.

The first incinerator discharge stream exchanges heat with the fresh air stream which has passed through the first heat exchanger (400) or the mixed stream of the fresh air stream and the evaporator top discharge stream in the second heat exchanger (410), and the fresh air stream or the mixed stream of the fresh air stream and the evaporator top discharge stream which has passed through the second heat exchanger (410) may be supplied to the incinerator (300).

First, when the first incinerator discharge stream is heat-exchanged with the fresh air stream discharged from the first heat exchanger (400) in the second heat exchanger (410), the heat-exchanged first incinerator discharge stream may be mixed with the second incinerator discharge stream in the third mixer (220), and the heat-exchanged fresh air stream may be supplied to the second mixer (210) and mixed with the mixed stream supplied from the first mixer (200) and a gas discharged from the waste heat treatment plant and then supplied to the incinerator (300).

In addition, when the first incinerator discharge stream is heat-exchanged with the mixed stream of the fresh air stream and the evaporator top discharge stream in the second heat exchanger (410), the heat-exchanged first incinerator discharge stream may be mixed with the second incinerator discharge stream in the third mixer (220) and the mixed stream of the heat-exchanged fresh air stream and the evaporator top discharge stream may be supplied to the incinerator (300).

As described above, the waste water incinerating method and apparatus according to the present application have been described and illustrated in the drawings, but only the essential components for understanding the present application have been described and illustrated, and a process and a device not separately described and illustrated in addition to the above described process and device, may be appropriately applied and used to implement the waste water incinerating method and apparatus according to the present application.

Hereinafter, the present application will be described in more detail with reference to examples. However, the following examples are intended to illustrate the present application and it is apparent to those skilled in the art that various changes and modifications may be made within the scope and spirit of the present application, and the scope of the present application is not limited thereto.

EXAMPLES

Example 1

Regarding the process flow diagram shown in FIG. 1, a process was simulated using the Aspen Plus Simulator of Aspen Technology, Inc.

Here, a temperature of waste water supplied to the first evaporator was set to 30° C., a pressure thereof was set to 0.2 kg/sqcmg, and a mass flow rate was set to 10,000 kg/hr. Components of the waste water included 87.57 wt % of water, 4.90% wt % of methanol, 2.33% wt % of butanol, 1.65 wt % of neopentyl glycol (NPG), 2.91 wt % of sodium chloride, and 0.64% wt % of organic substances including butyl aldehyde, octanol, trimethylamine, and the like.

In addition, the fresh air stream supplied to the incinerator was set to 20° C. and the composition was set to 21 mol % of oxygen and 79 mol % of nitrogen.

Example 2

Figure 2:
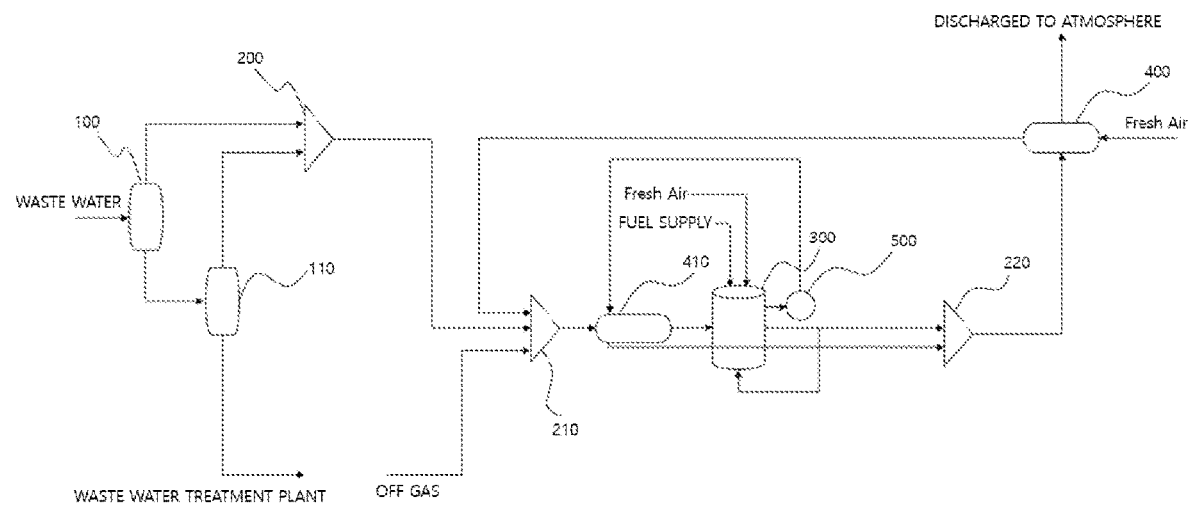

A process was performed in the same manner as in Example 1, except for simulating a process using the Aspen Plus Simulator of Aspen Technology, Inc. in accordance with the process flow diagram shown in FIG. 2.

Comparative Example

Figure 3:
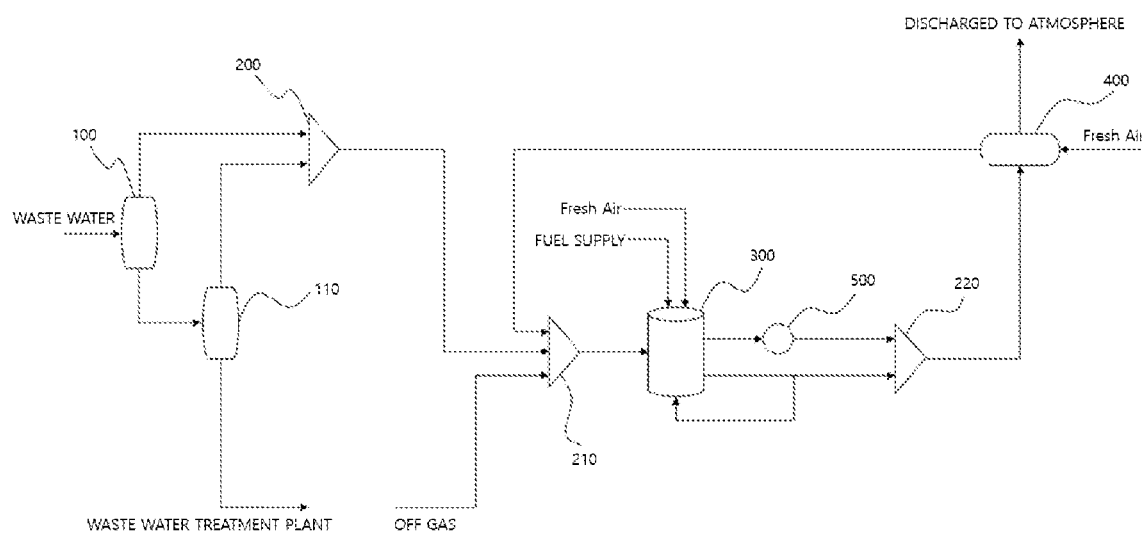
FIG. 3 is a process flow diagram of a waste water incinerating method according to a comparative example.

A process was performed in the same manner as in Example 1, except that the process was simulated using the Aspen Plus Simulator of Aspen Technology, Inc. in accordance with the process flow diagram shown in FIG. 3. FIG. 3 is a process flow diagram without the second heat exchanger in the waste water incinerating process according to the present application.

Experimental Example

As a result of the process simulation according to Examples and Comparative Example, temperatures of the respective streams according to the process flows are shown in Table 1 below, and the amount of fuel input to the incinerator and thermal properties of the heat exchangers are shown in Table 2 below.

TABLE 1

| Stream | Temperature (° C.) | | |
|---|---|---|---|
| | Example 1 | Example 2 | Comparative Example |
| Waste water | 30.0 | 30.0 | 30.0 |
| Top discharge stream of first evaporator | 102.0 | 102.0 | 102.0 |
| Bottom discharge stream of first evaporator | 102.0 | 102.0 | 102.0 |
| Top discharge stream of second evaporator | 105.0 | 105.0 | 105.0 |
| Bottom discharge stream of second evaporator | 105.0 | 105.0 | 105.0 |
| Discharge stream of first mixer | 120.0 | 120.0 | 120.0 |
| Off gas supply stream from waste water treatment plant | 90.0 | 90.0 | 90.0 |
| Stream supplied from second heat exchanger to second mixer | 286.5 | — | — |
| Stream supplied from second mixer to second heat exchanger | — | 171.7 | — |
| Stream supplied to incinerator | 239.5 | 243.9 | 171.7 |
| Stream supplied from incinerator to steam generator | 903.0 | 903.0 | 903.0 |
| Stream supplied from steam generator to second heat exchanger | 450.0 | 450 | — |
| Stream supplied from second heat exchanger to third mixer | 291.5 | 248.9 | — |
| Stream supplied from steam generator to third mixer | — | — | 450.0 |
| Stream supplied from third mixer to first heat exchanger | 217.7 | 203.2 | 273.4 |
| Fresh air stream supplied to first heat exchanger | 20.0 | 20.0 | 20.0 |
| Stream supplied from first heat exchanger to second heat exchanger | 207.7 | — | — |
| Stream discharged from first heat exchanger to second mixer | — | 193.2 | 193.2 |
| Stream discharged from first heat exchanger to atmosphere | 87.1 | 82.5 | 155.0 |

TABLE 2

| | Example 1 | | | Example 2 | | | |
|---|---|---|---|---|---|---|---|
| | First heat exchanger | Second heat exchanger | First + second heat exchangers | First heat exchanger | Second heat exchanger | First + second heat exchangers | Comparative example |
| Calculated heat duty (Gcal/hr) | 2.42 | 1.03 | 3.43 | 2.22 | 1.30 | 3.52 | 2.22 |
| Required exchanger area (sqm) | 114.88 | 11.72 | 126.60 | 105.91 | 13.53 | 119.44 | 27.06 |
| Actual exchanger area (sqm) | 144.88 | 11.72 | 126.60 | 105.91 | 13.53 | 119.44 | 27.06 |
| Average U (kcal/hr-sqm-K) | 730.87 | 730.87 | 730.87 | 730.87 | 730.87 | 730.87 | 730.87 |
| UA (cal/sec-K) | 23323.14 | 2378.65 | — | 21501.8 | 2746 | — | 5494.20 |
| LMTD (corrected) | 28.75 | 118.78 | — | 28.66 | 131.60 | — | 108.80 |
| Amount of fuel input to incinerator (kg/hr) | | 782.4 | | | 775.2 | | 891.4 |

\* Calculated heat duty, required exchanger area, actual exchanger area, average U, UA, and LMTD (corrected) are values calculated through calculation formulas using factors such as a composition of each stream in a process, a flow rate, a temperature, and a heat capacity, etc.
Calculated heat duty: Q = specific heat at constant pressure × flow rate × (temperature difference between inlet and outlet)
Required exchanger area, actual exchanger area: A = Q/K × ΔT (K is overall coefficient of heat transfer, ΔT is logarithmic mean temperature difference (LMTD) between inlet and outlet temperatures)
Average U: U = 1/(1/h + x/k) = Q/(A × ΔT) (h is film coefficient of heat transfer, k is heat transfer coefficient of heated metal surface, x is thickness of heated metal surface, A is area of heat exchanger, ΔT is logarithmic mean temperature difference between stream and heated surface)
UA (actual heat transfer coefficient): Average U × actual exchanger area
LMTD (corrected): LMTD × correction factor First, referring to Table 1, comparing the waste water incinerating process flows according to Examples 1 and 2 with the waste water incinerating process flow according to Comparative Example, it can be seen that a temperature of a stream discharged from the third mixer (220) and supplied to the first heat exchanger (400), a temperature of a stream discharged from the second mixer (210) and supplied to the incinerator (300), and a temperature of a stream discharged from the first heat exchanger (400) to the atmosphere are significantly different according to installation of the second heat exchanger (410).

Specifically, in the waste water incinerating process of Example 1, by installing the second heat exchanger (410), the stream at 450° C. discharged from the steam generator (500) is heat-exchanged in the second heat exchanger (410) so as to reduce its temperature to 291.5° C. and then supplied to the third mixer (220).

In addition, in the waste water incinerating process of Example 2, by installing the second heat exchanger (410), the stream at 450° C. discharged from the steam generator (500) is heat-exchanged in the second heat exchanger (410) so as to reduce its temperature to 248.9° C. and then supplied to the third mixer (220).

Meanwhile, in the waste water incinerating process of Comparative Example in which the second heat exchanger is not installed, a stream at 450° C. discharged from the steam generator (500) is directly supplied to the third mixer (220). Thus, in Examples 1 and 2 and Comparative Example, the temperatures of the stream discharged from the third mixer (220) and supplied to the first heat exchanger (400) are 217.7° C., 203.2° C. and 273.4° C. respectively, and thus it can be seen that the temperature of the stream discharged from the third mixer (220) and supplied to the first heat exchanger (400) in Examples 1 and 2 is significantly low.

In addition, in the first embodiment, a stream supplied from the third mixer (220) and a fresh air stream are heat-exchanged in the first heat exchanger (400), and the fresh air stream heat-exchanged in the first heat exchanger (400) is supplied again to the incinerator (300) through the second mixer (210). Here, the fresh air stream at 20° C. is heat-exchanged with the stream at 217.7° C. supplied from the third mixer (220) and discharged at a temperature of 207.7° C. from the first heat exchanger (400). Thereafter, the fresh air stream discharged from the first heat exchanger (400) is supplied to the second heat exchanger (410) and heat-exchanged with a first incinerator discharge stream at 450° C. Accordingly, in Example 1, the fresh air stream is increased in temperature to 286.5° C., while recycling heat in the process through the first heat exchanger (400) and the second heat exchanger (410). The fresh air stream increased in temperature is mixed with a stream discharged from the first mixer (200) and a gas discharged from the waste water treatment plant in the second mixer (210), and the mixed stream is supplied at a temperature of 239.5° C. to the incinerator (300).

In addition, in Example 2, the stream discharged from the steam generator (500) is supplied to the second heat exchanger (410), and the stream discharged from the steam generator (500) and the stream discharged from the second mixer (210) are heat-exchanged in the second heat exchanger (410). Here, the stream discharged from the second mixer (210) obtains heat from the stream discharged from the steam generator (500) and is supplied at a temperature of 243.9° C. to the incinerator (300).

Meanwhile, in Comparative Example, a fresh air stream at 20° C. is heat-exchanged with the stream at 273.4° C. supplied from the third mixer (220) and discharged at a temperature of 193.2° C. from the first heat exchanger (400). Thereafter, the fresh air stream discharged from the first heat exchanger (400) is directly mixed with the stream discharged from the first mixer (200) and the gas discharged from the waste water treatment plant in the second mixer (210) and supplied at a temperature of 171.7° C. to the incinerator (300). As a result, in Comparative Example, the stream supplied to the incinerator (300) is supplied at a temperature of 171.7° C., but the stream is supplied at a temperature of 239.5° C. in Example 1 and is supplied at a temperature of 243.9° C. in Example 2, and thus, Examples 1 and 2 can save heat required to incinerate the waste water in the incinerator (300) by the temperature difference compared to Comparative Example.

In addition, due to the temperature difference of the stream discharged from the third mixer (220) and supplied to the first heat exchanger (400), there is also a difference in the temperature discharged to the atmosphere. Specifically, in the case of Example 1, the stream at 217.7° C. is discharged from the third mixer (220) and supplied to the first heat exchanger (400), and the stream is heat-exchanged with the fresh air stream at 20° C. in the first heat exchanger (400). Here, the stream discharged from the third mixer (220) and supplied to the first heat exchanger (400) is discharged to the atmosphere at 87.1° C.

In addition, in Example 2, the stream at 203.2° C. is discharged from the third mixer (220) and supplied to the first heat exchanger (400), and the stream is heat-exchanged with the fresh air stream at 20° C. in the first heat exchanger (410). Here, the stream discharged from the third mixer (220) and supplied to the first heat exchanger (400) is discharged to the atmosphere at 82.5° C.

Meanwhile, in Comparative Example, a stream at 273.4° C. having a high temperature as compared to Examples 1 and 2 is discharged from the third mixer (220) and supplied to the first heat exchanger (400), and the stream is heat-exchanged with a fresh air stream at 20° C. in the first heat exchanger (400). Here, the stream discharged from the third mixer (220) and supplied to the first heat exchanger (400) is discharged to the atmosphere at 155° C., which is significantly higher than 87.1° C. and 82.5° C. which are atmosphere discharge temperatures according to Examples 1 and 2.

As a result, this means that, heat corresponding to 67.9° C. to 72.5° C. was recycled in the process by installing the second heat exchanger (410) in Examples 1 and 2.

In addition, an energy saving effect according to the installation of the second heat exchanger (410) may also be confirmed in Table 2 above. Referring to Table 2, it can be seen that, the amount of heat obtained from the heat exchanger in Examples 1 and 2 were 3.43 Gcal/hr and 3.52 Gcal/hr respectively, and about 1.21 Gcal/hr to 1.3 Gcal/hr was saved as compared to Comparative Example.

In addition, it can be seen that actual heat transfer coefficients (UAs) of the first heat exchanger (400) in Examples 1 and 2 were 23323.14 cal/sec-K and 21501.8 cal/sec-K respectively, and heat transfer rates thereof are excellent as compared to Comparative Example in which the UA is 5494.20 cal/sec-K.

In addition, in the case of Examples 1 and 2, the amounts of fuel input to the incinerator were 782.4 kg/hr and 775.2 kg/hr respectively, and thus it can be seen that fuel of about 114.6 kg to 116.2 kg was saved per hour as compared to Comparative Example.

The invention claimed is:

1. A waste water incinerating method comprising:
supplying waste water to an evaporator and evaporating the waste water;
supplying an evaporator top discharge stream discharged from the evaporator to an incinerator and incinerating the evaporator top discharge stream;
mixing two or more incinerator discharge streams including a first incinerator discharge stream and a second incinerator discharge stream discharged from the incinerator and forming a mixed discharge stream; and
heat-exchanging the mixed discharge stream and a fresh air stream in a first heat exchanger,
wherein the first incinerator discharge stream is passed through a second heat exchanger, then mixed with the second incinerator discharge stream to form the mixed discharge stream, and
wherein a temperature of the first incinerator discharge stream is higher than a temperature of the second incinerator discharge stream.

2. The method of claim 1, wherein the first incinerator discharge stream is heat-exchanged in the second heat exchanger with a fresh air stream which has passed through the first heat exchanger or a mixed stream of the fresh air stream and the evaporator top discharge stream.

3. The method of claim 1, wherein a temperature of the first incinerator discharge stream which has passed through the second heat exchanger is lower than a temperature of the first incinerator discharge stream before passing through the second heat exchanger.

4. The method of claim 1, wherein a temperature of a stream discharged to the atmosphere from the first heat exchanger is 90° C. or lower.

5. The method of claim 2, wherein the fresh air stream or the mixed stream of the fresh air stream and the evaporator top discharge stream heat-exchanged in the second heat exchanger is supplied to the incinerator, and a temperature of the fresh air stream or the mixed stream of the fresh air stream and the evaporator top discharge stream which has passed through the second heat exchanger is higher than a temperature thereof before passing through the second heat exchanger.

6. The method of claim 5, wherein the temperature of the fresh air stream or the mixed stream of the fresh air stream and the evaporator top discharge stream which has passed through the second heat exchanger is 200° C. to 300° C.

7. A waste water incinerating apparatus comprising:
an evaporator evaporating supplied waste water and supplying an evaporator top discharge stream to an incinerator;
the incinerator receiving the evaporator top discharge stream supplied from the evaporator and incinerating the evaporator top discharge stream to supply two or more incinerator discharge streams including a first incinerator discharge stream and a second incinerator discharge stream to a third mixer;
the third mixer receiving the two or more incinerator discharge streams including the first incinerator discharge stream and the second incinerator discharge stream supplied from the incinerator and supplying a mixed discharge stream of the first incinerator discharge stream and the second incinerator discharge stream to a first heat exchanger;
the first heat exchanger heat-exchanging the mixed discharge stream supplied from the third mixer with a supplied fresh air stream; and
a second heat exchanger heat-exchanging the first incinerator discharge stream discharged from the incinerator and supplying the heat-exchanged first incinerator discharge stream to the third mixer,
wherein a temperature of the first incinerator discharge stream is higher than a temperature of the second incinerator discharge stream.

8. The apparatus of claim 7, wherein the first incinerator discharge stream is heat-exchanged with a fresh air stream discharged from the first heat exchanger or a mixed stream of the fresh air stream and the evaporator top discharge stream in the second heat exchanger, and the fresh air stream or the mixed stream of the fresh air stream and the evaporator top discharge stream which has passed through the second heat exchanger is supplied to the incinerator.

9. The apparatus of claim 7, wherein the incinerator is a regenerative thermal oxidizer (RTO).

\* \* \* \* \*